Aug. 2, 1955
P. KLAMP
2,714,442
TROLLEY STRUCTURE FOR CONVEYORS
Filed July 21, 1954
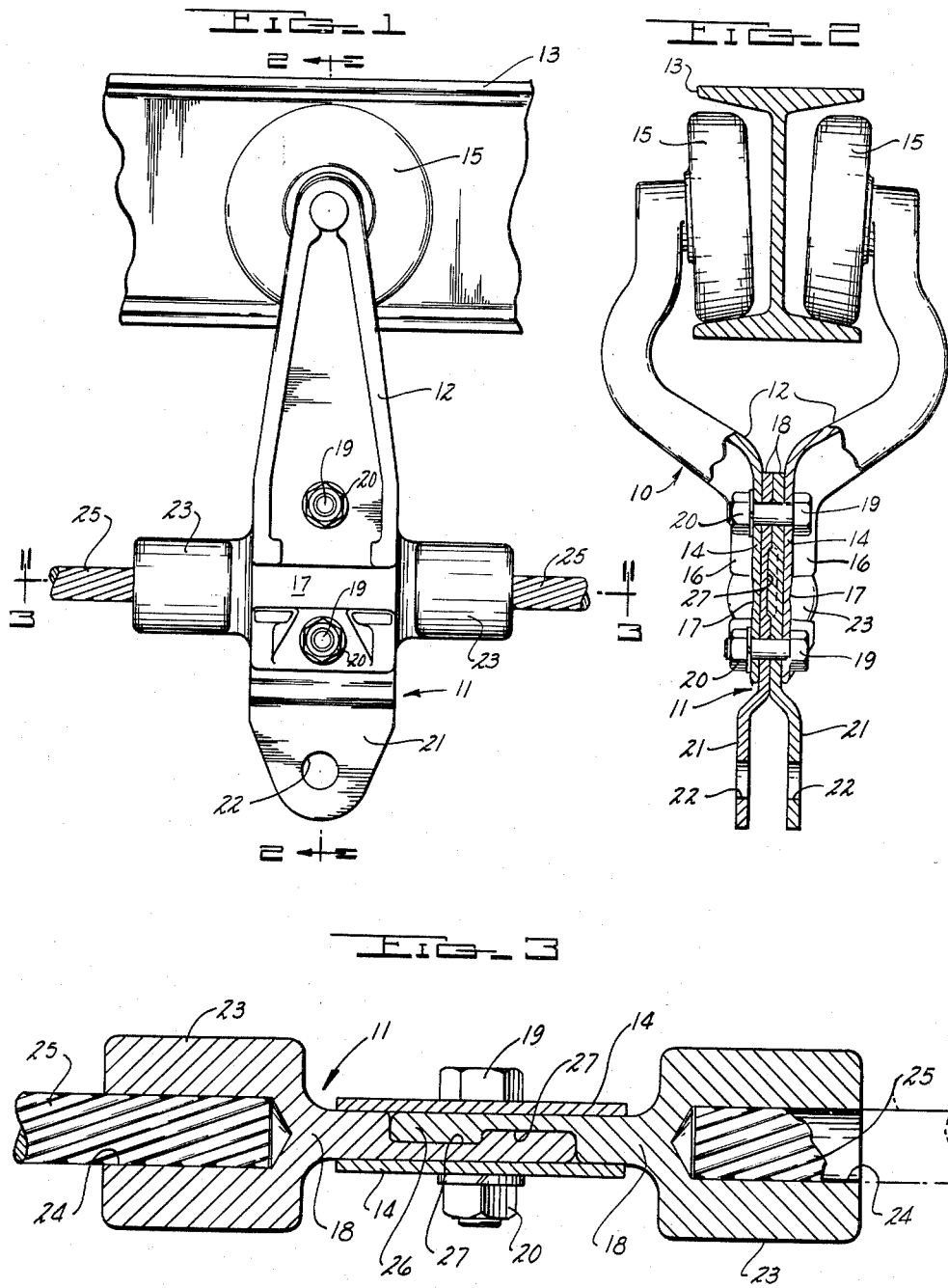
INVENTOR.
PAUL KLAMP
BY
Whittemore, Hulbert & Belknap
ATTORNEYS United States Patent Office 2,714,442
Patented Aug. 2, 1955

2,714,442

TROLLEY STRUCTURE FOR CONVEYORS

Paul Klamp, Detroit, Mich., assignor to Mechanical Handling Systems, Inc., Detroit, Mich., a corporation of Michigan Application July 21, 1954, Serial No. 444,864

8 Claims. (Cl. 198—177)

This invention relates to trolley assemblies for conveyors and has as one of its objects to provide an improved attachment for readily converting a chain-type of trolley to a cable type.

It is another object of this invention to provide a trolley assembly comprising a work supporting bracket having cooperating sections removably clamped between the arms of the trolley by fastener elements and respectively having terminal portions at opposite sides of the trolley for securing adjacent ends of cables to the trolley.

It is a further object of this invention to provide interengaging means on the respective sections of the work supporting bracket and arranged to establish a driving connection between the sections of the work supporting bracket independently of the clamping means.

The foregoing as well as other objects will be made more apparent as this description proceeds especially when considered in connection with the accompanying drawing, wherein:

Figure 1 is a side elevational view of a trolley assembly embodying the features of this invention;

Figure 2 is a sectional view taken on the line 2—2 of Figure 1; and

Figure 3 is a sectional view taken on the line 3—3 of Figure 1.

The trolley assembly selected herein for the purpose of illustration comprises a yoke 10 and a work supporting or hanger bracket 11. The yoke 10 is composed of a pair of arms 12 having the upper ends spaced laterally from one another to receive a length of track 13 therebetween and having the lower ends terminating in laterally spaced depending plate portions 14. As shown in Figure 2 of the drawings, the track 13 is in the form of an I-beam and a pair of rollers 15 are respectively journaled on the upper ends of the arms 12 in positions to have a rolling engagement with the bottom flange of the track at opposite sides of the web of the latter.

The arms 12 are curved inwardly below the length of track 13 in a manner to locate the plate portions 14 in symmetrical relationship to a vertical plane including the web of the track 13. It will also be noted from Figure 2 of the drawing that the arms 12 including the plate portions 14 are reinforced by webs 16 which are interrupted adjacent the bottom edges of the portions 14 to provide recesses 17. The recesses 17 provide sufficient clearance to respectively receive the opposite bars of a link chain (not shown) in instances where it is desired to propel the trolley assembly along the track 13 by a chain. However, in the present instance, it is preferred to propel the trolley assembly along the track 13 by lengths of cable and, hence, no chain is shown in the drawing.

The hanger bracket 11 comprises two sections in the form of plates 18 arranged in face to face contact and clamped between the portions 14 of the arms 12 by a pair of vertically spaced bolts 19 respectively positioned above and below the recesses 17 with the axes thereof lying in a common vertical plane including the axes of the rollers 15. The shank portions of the bolts 19 respectively project through aligned openings in the plate portions 14 and sections 18 of the hanger bracket 11 to threadably receive clamping nuts 20.

The lower ends 21 of the plates 18 are offset laterally outwardly from one another below the plate portions 14 of the arms 12 and are formed with aligned openings 22 for engagement by a suitable work carrier. Projecting laterally outwardly from the outer edge of each plate 18 is an enlargement 23 and this enlargement is axially bored as at 24 to receive the free end of a length of cable 25. As shown in Figure 1 of the drawing, the enlargements 23 are in the form of terminals and are in axial alignment with the recesses 17. The enlargements 23 or terminals may either be round or polygonally shaped in cross section and are preferably swaged into permanent connected relationship with the adjacent ends of the lengths of cable 25.

As shown in Figure 3 of the drawings, each section or plate 18 of the hanger bracket 11 has a part or enlargement 26 at the inner edge in alignment with the terminal portions 23. The enlargement 26 on one section 18 projects into a recess 27 formed in the other section 18 to provide an interengaging driving connection between the two sections. The arrangement is such that the driving thrust applied to one cable 25 is transmitted to the adjacent length of cable through the sections 18 independently of the bolts 19 with the result that the shearing stress applied to the bolts is reduced to a minimum. It will also be noted from the foregoing that the sections 18 are identical in construction and are interchangeable with the result that the cost of manufacture and handling is also reduced.

What I claim as my invention is:

1. A trolley assembly for cable type conveyors, comprising arms having laterally spaced parts, a bracket comprising separable sections having portions arranged in face to face contact between the parts aforesaid of the arms and respectively having cable anchorage means extending from opposite edges of said portions for attachment to adjacent ends of lengths of cable, means for removably clamping the parts of the arms together with the sections therebetween, and a part extending laterally inwardly from each section into a recess formed in the adjacent section and coacting with the opposite side walls of the recess to provide a driving connection between the sections independently of the clamping means.

2. The structure defined in claim 1 wherein the laterally spaced parts have chain receiving recesses at opposite sides and wherein the cable anchorage means on the respective bracket sections are aligned with said recesses.

3. The structure defined in claim 1 wherein the parts on the respective sections and the coacting recesses in said sections are aligned with the cable anchorage means.

4. A trolley assembly for cable type conveyors, comprising arms having laterally spaced parts, a bracket comprising separable sections having portions arranged in face to face contact between the parts aforesaid of the arms and respectively having terminal enlargements at the outer edges of said portions extending beyond the adjacent edges of the parts aforesaid of the arms, said terminal enlargements having means for respectively securing adjacent ends of lengths of cable thereto, means for removably clamping the parts aforesaid of the arms and said sections together, and interengaging means on the sections between the terminal enlargements for driving one section from the other independently of the clamping means.

5. The structure defined in claim 4 wherein the sections of the bracket are of one-piece construction and are interchangeable with one another.

6. The structure defined in claim 4 wherein the terminal enlargements are in alignment with one another and wherein the interengaging means comprises projections respectively extending inwardly from the sections into recesses formed in the inner surfaces of said sections.

7. The structure defined in claim 6 wherein the parts aforesaid of the arms have chain receiving recesses in the outer sides thereof and extending between the terminal enlargements.

8. A trolley assembly for cable type conveyors, comprising arms having laterally spaced parts, a bracket comprising separable sections having portions arranged between the parts aforesaid of the arms and respectively having cable anchorage means extending from opposite edges of said portions for attachment to adjacent ends of lengths of cable, means for removably clamping the parts aforesaid of said arms together with said sections therebetween, and interengaging means on said sections for driving one section from the other independently of said clamping means.

References Cited in the file of this patent

UNITED STATES PATENTS 2,075,261   Bishop ---------------- Mar. 30, 1937

FOREIGN PATENTS 622,808   Great Britain ----------- May 6, 1949